United States Patent [19]

Nishidai

[11] Patent Number: 5,537,514
[45] Date of Patent: Jul. 16, 1996

[54] METHOD OF REARRANGING AND METHOD OF CODING FUZZY REASONING RULES, AND METHOD OF FUZZY REASONING PROCESSING IN ACCORDANCE WITH SAID RULES

[75] Inventor: Hajime Nishidai, Kyoto, Japan

[73] Assignee: Omron Corporation, Kyoto, Japan

[21] Appl. No.: 377,500

[22] Filed: Jan. 24, 1995

Related U.S. Application Data

[63] Continuation of Ser. No. 941,131, filed as PCT/JP91/00711, May 28, 1991 published as WO91/19252, Dec. 12, 1991, abandoned.

[30] Foreign Application Priority Data

May 29, 1990 [JP] Japan ................................ 2-139106

[51] Int. Cl.$^6$ .............................. G06F 9/44; G05B 13/02
[52] U.S. Cl. .............................. 395/51; 395/76; 395/900
[58] Field of Search ........................................ 395/64, 76

[56] References Cited

U.S. PATENT DOCUMENTS

| | | | |
|---|---|---|---|
| 4,999,786 | 3/1991 | Mizutani et al. | 395/61 |
| 5,022,498 | 6/1991 | Sasaki et al. | 395/61 |
| 5,047,951 | 9/1991 | Ono | 395/64 |
| 5,237,685 | 8/1993 | Toney | 395/650 |
| 5,305,424 | 4/1994 | Ma et al. | 395/51 |

FOREIGN PATENT DOCUMENTS

| | | | |
|---|---|---|---|
| 62-14230 | 1/1987 | Japan | G06F 7/28 |

OTHER PUBLICATIONS

Journal A. vol. 3, No. 4, Dec. 1989 Index: "An expert system shell for the real–time ccommand of inustrial processes," G. Libert, pp. 41–43.

IEE Expert, vol. 3, No. 4, 1989, "Parallel Rule–Based Fuzzy Inference On Mesh–Connected Systolic Arrays," M. A. Escherta, et al., pp. 25–27.

M. I. Schor et al., "Advances in RETE Pattern Matching," Proc. 1986 American Assoc. Artificial Intelligence Conf., pp. 226–232.

J. Bowen and J. Kang, "Conflict Resolution in Fuzzy Forward Chaining Production Systems," AAAI 1988, pp. 117–121.

Building Validation Tools for Knowledge–Based Systems; Stachowitz et al; pp. 209–216; 1987.

An article presented before the Information Processing Society of Japan on Mar. 11–13, 1961, pp. 1517–1518.

*Primary Examiner*—Robert W. Downs
*Attorney, Agent, or Firm*—Dickstein, Shapiro & Morin

[57] ABSTRACT

In the antecedents of a group of fuzzy reasoning rules, a proposition x1=PL which appears the most frequently is extracted, and one group consisting of Rules 1, 2, 6, 8, 9 which contain this proposition is formed. Rule 8, in which only the proposition x1=PL is contained in its antecedent, is placed at the beginning of an array of rules. In the Rules 1, 2, 6, 9 which remain, a proposition x2=PM which appears the next most frequently is extracted, and a sub-group consisting of Rules 1, 6, 9 which contain this proposition is formed. The rules of this sub-group are arranged in a fixed order following the Rule 8. The remaining Rule 2 is placed next in the array. Processing is performed in similar fashion with regard to other Rules 3, 4, 5, 7, 10. By thus rearranging rules in accordance with a sequence which includes propositions having a high frequency of appearance, redundant processing regarding redundant propositions is eliminated and processing is made more efficient.

16 Claims, 8 Drawing Sheets

Fig.2

RULE 1 : If $x_1 = PL$ and $x_2 = PM$ and $x_4 = PS$, then $y_1 = PM$
RULE 2 : If $x_1 = PL$ and $x_4 = ZR$, then $y_1 = ZR$
RULE 3 : If $x_2 = PS$ and $x_3 = PS$, then $y_1 = PS$
RULE 4 : If $x_2 = PS$ and $x_3 = PS$ and $x_4 = NS$, then $y_1 = NS$
RULE 5 : If $x_3 = NS$ and $x_4 = ZR$, then $y_1 = ZR$
RULE 6 : If $x_1 = PL$ and $x_2 = PM$ and $x_3 = PM$, then $y_1 = PM$
RULE 7 : If $x_2 = PS$ and $x_3 = PS$ and $x_4 = ZR$, then $y_1 = ZR$
RULE 8 : If $x_1 = PL$ and $x_3 = PM$, then $y_1 = PL$
RULE 9 : If $x_1 = PL$ and $x_2 = PM$ and $x_3 = PM$, then $y_2 = NL$
RULE 10 : If $x_2 = PS$ and $x_3 = PS$ and $x_4 = ZR$, then $y_2 = ZR$
.....

Fig. 3

(RULE 8)    : If x1=PL                                              , then y1=PL
(RULE 6, 9) : If x1=PL and x2=PM and x3=PM                          , then y1=PM or y2=NL
(RULE 1)    : If x1=PL and x2=PM and x4=PS                          , then y1=PM
(RULE 2)    : If x1=PL and x4=ZR                                    , then y1=ZR
(RULE 3)    : If x2=PS and x3=PS                                    , then y1=PS
(RULE 4)    : If x2=PS and x3=PS and x4=NS                          , then y1=NS
(RULE 7, 10): If x2=PS and x3=PS and x4=ZR                          , then y1=ZR or y2=ZR
(RULE 5)    : If x3=NS and x4=ZR                                    , then y1=ZR

Fig. 6

| | |
|---|---|
| IF | x1 = PL |
| THEN | y1 = PL |
| AND 1 | x2 = PM |
| AND 2 | x3 = PM |
| THEN | y1 = PM |
| THEN | y2 = NL |
| AND 2 | x4 = PS |
| THEN | y1 = PM |
| AND 1 | x4 = ZR |
| THEN | y1 = ZR |
| IF | x2 = PS |
| ⋮ | ⋮ |
| DEF | DETERMINISTIC PROCESSING |
| END | END PROCESSING |

Fig. 7a
INPUT-DATA AREA

| x 1 |
| --- |
| x 2 |
| x 3 |
| x 4 |
| |
| ⋮ |

Fig. 7b
OUTPUT-DATA AREA

| y 1 |
| --- |
| y 2 |
| |
| ⋮ |

Fig. 7c
CONSEQUENT-DATA AREA

| | |
| --- | --- |
| | P L |
| | P M |
| | P S |
| y 1 | Z R |
| | N S |
| | N M |
| | N L |
| | P L |
| | P M |
| y 2 | |
| | ⋮ |

Fig. 8
DEGREE-OF-MEMBERSHIP REGISTER

| | |
| --- | --- |
| R 1 | |
| R 2 | |
| R 3 | |
| R 4 | |
| ⋮ | ⋮ |

METHOD OF REARRANGING AND METHOD OF CODING FUZZY REASONING RULES, AND METHOD OF FUZZY REASONING PROCESSING IN ACCORDANCE WITH SAID RULES

This application is a continuation of application Ser. No. 07/941,131, filed as PCT/JP90/00711, May 28, 1991, published as WO91/19252, Dec. 12, 1991, now abandoned.

TECHNICAL FIELD

This invention relates to a method of rearranging fuzzy reasoning rules, a method of coding these rules, and a method of executing fuzzy reasoning processing in accordance with the rules that have been rearranged or coded.

BACKGROUND ART

Fuzzy theory is being widely applied for the purpose of utilizing knowledge, which is difficult to describe by mathematical expressions of know-how possessed by skilled engineers and technicians, in automatic control, decision making and automatic control of controlled systems having strong non-linearity, such as in fault diagnosis.

Knowledge for fuzzy reasoning in many cases is expressed by a plurality (one set) of rules described in an "If, then" format. An antecedent generally contains a plurality of fuzzy propositions (pairs of input variables and membership functions) connected by "and". A consequent also contains a plurality of fuzzy propositions (pairs of output variables and membership functions).

A set of fuzzy reasoning rules of this kind is stored in a general-purpose digital computer programmed to make fuzzy reasoning operations possible, or in a fuzzy processor having an architecture dedicated to fuzzy reasoning operations. The digital computer or fuzzy processor executes fuzzy reasoning operations by applying given input data to the rules. A fuzzy reasoning operation often is executed by so-called serial processing, in which a plurality of established rules are executed sequentially one at a time.

There are occasions where a set of fuzzy reasoning rules contains identical fuzzy propositions. The reason for this is that redundancy in parts of the rules is permitted in rule creation. In a case where there the number of rules is very large, redundant fuzzy propositions also increase of their own accord and on occasion become too prolix.

Since fuzzy reasoning operations often are executed by serial processing, as set forth above, the same operation is repeated a plurality of times if some of the rules are redundant. The result is a decline in processing efficiency and a reduction in computing speed.

An object of the present invention is to make it possible to obtain a high processing efficiency even if parts of the rules in a set of rules are redundant.

DISCLOSURE OF THE INVENTION

A method of rearranging fuzzy reasoning rules according to the present invention includes grouping a plurality of given fuzzy reasoning rules, each of which comprises an antecedent and a consequent, into rules containing a common antecedent proposition, and arranging the rules in an order in which priority is given to antecedent propositions having a high frequency of appearance and results of computing degree of membership of an antecedent proposition in a preceding rule are capable of being utilized in processing of a succeeding rule.

A method of coding fuzzy reasoning rules which includes the following steps executed with regard to a plurality of given fuzzy reasoning rules each of which comprises an antecedent and a consequent:

(a) extracting an antecedent proposition having the highest frequency of appearance and forming one group consisting of rules which include the extracted antecedent proposition in common;

(b) if the above-mentioned group has a rule in which an antecedent ends in the common antecedent proposition, coding this rule, storing the coded rule in a rule memory and excluding this rule from the above-mentioned group;

(c) extracting an antecedent proposition having the next highest frequency of appearance from among the rules remaining in the group, and forming a sub-group consisting of rules which include this extracted antecedent proposition in common;

(d) coding rules and storing the coded rules in the rule memory in the order of common antecedent propositions having the highest frequency of appearance and in an order in which the common antecedent propositions are included in larger proportion, by repeating the processing of (b) and (c) with regard to the above-mentioned sub-group; and (e) after the processing of (a) through (d) has been completed with regard to the one group, repeating the processing of (a) through (d), until rules are eliminated, with regard to remaining rules from which the rules contained in the group are omitted.

In an embodiment of the coding method according to the invention, sub-rules are formed by separating a rule into a proposition which constitute the antecedent or the consequent, and variables and membership functions contained in the sub-rules are coded.

In another embodiment of the coding method according to the invention, a command is assigned to the code of each sub-rule, and the sub-rule is stored in the rule memory, in dependence upon whether a sub-rule is contained in an antecedent or a consequent, and in dependence upon the position of the sub-rule in the order thereof.

In accordance with the method of rearranging and the method of coding fuzzy reasoning rules according to the present invention, a plurality of rules are arranged by taking note of redundant fuzzy propositions described in the rules. With regard to propositions that are redundant, a rearrangement is made in such a manner that reasoning processing will be concluded by a single operation for computing degree of membership. As a result, it is no longer necessary to repeat the same operation a number of times, processing time is curtailed and the efficiency of fuzzy reasoning is improved.

A method of fuzzy reasoning processing according to the invention involves executing processing in accordance with the rules rearranged and coded by the above-described method of coding fuzzy reasoning rules, the method including reading the code of a sub-rule which includes a command out of the rule memory; determining the type of the command of the sub-rule code read out; if the command is indicative of a sub-rule at the beginning of an antecedent, calculating degree of membership in accordance with this sub-rule using given input data and temporarily storing the calculated degree of membership; if the command is indicative of a sub-rule at a position from the second onward in the antecedent, calculating degree of membership in accordance with this sub-rule using given input data, performing a predetermined operation between this calculated degree of membership and the degree of membership calculated and temporarily stored previously, and temporarily storing results of this operation; and if the command is indicative of a sub-rule of a consequent, performing a predetermined consequent operation with regard to this rule using the degree of membership previosuly operated and temporarily stored.

In accordance with the fuzzy reasoning processing method according to the invention, redundant fuzzy propositions appear in concentrated fashion, degrees of membership calculated with regard to these fuzzy propositions are stored temporarily, and the degrees of membership are utilized in the processing of other rules. Since not that many of the calculated degrees of membership are utilized in the processing of other rules, a small storage area for temporary storage of the degrees of membership will suffice. This makes it possible to reduce the numbers of registers which store the degrees of membership. This is especially effective in a case where a digital fuzzy reasoning IC dedicated to fuzzy reasoning is constructed.

BRIEF DESCRIPTION OF THE DRAWINGS

FIG. 2 illustrates an example of given fuzzy reasoning rules;

FIG. 3 illustrates fuzzy reasoning rules rearranged by the method of the invention;

FIG. 6 illustrates part of a rule memory in which rules that have been rearranged and coded are stored;

FIG. 7a shows an input data area, 7b an output data area and 7c a consequent data area;

FIG. 8 shows a membership register; and

BEST MODE FOR CARRYING OUT THE INVENTION

Figure 1:
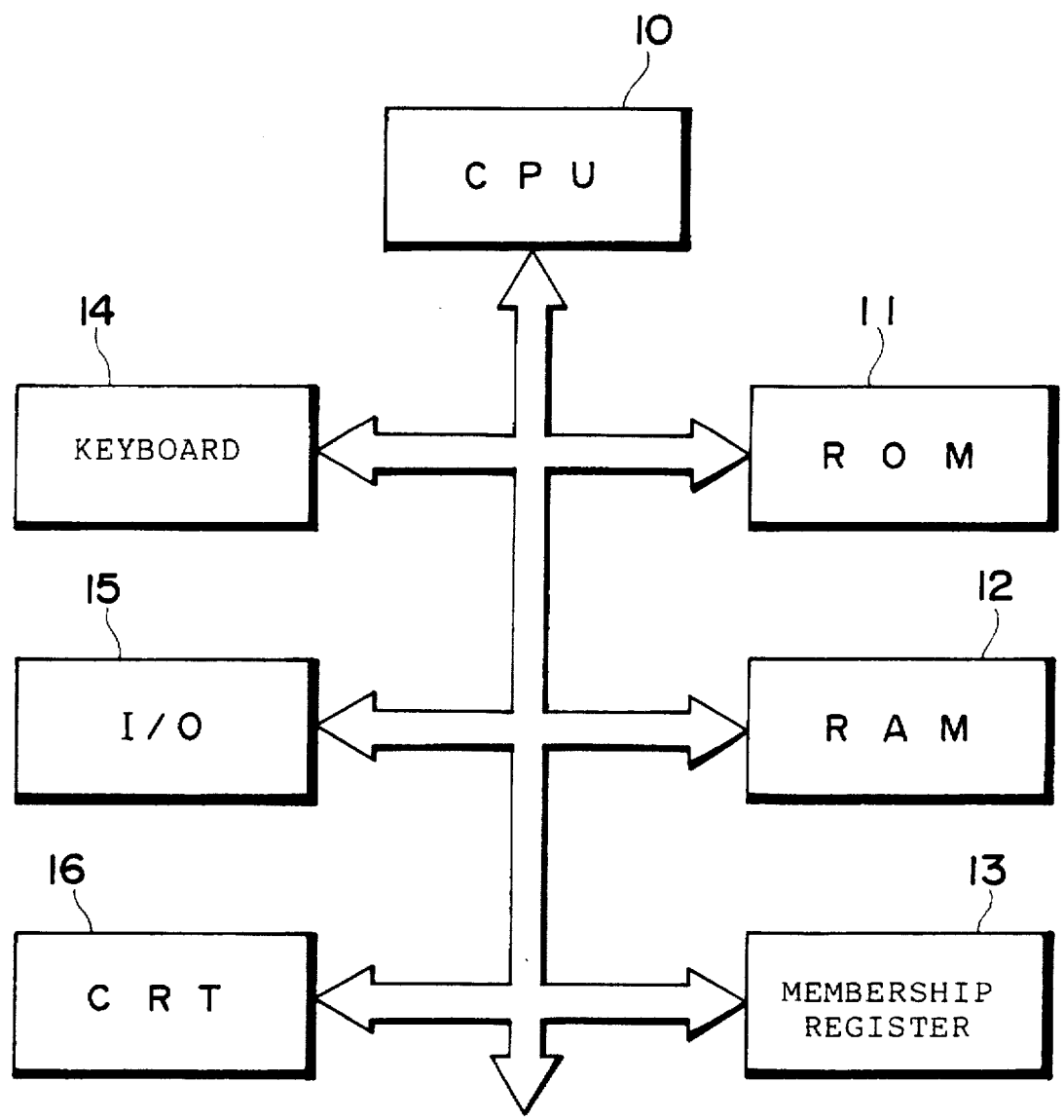
FIG. 1 is a block diagram illustrating the electrical configuration of a fuzzy reasoning processing apparatus.

FIG. 1 illustrates the general features of the configuration of a fuzzy reasoning processing apparatus. The fuzzy reasoning processing apparatus is realized by a general-purpose digital computer programmed to make fuzzy reasoning operations possible, or a fuzzy processor having an architecture dedicated to fuzzy reasoning operations.

The fuzzy reasoning processing apparatus comprises a CPU 10 which executes rule rearranging and coding processing, described later, a ROM 11 storing an operating system, a fuzzy reasoning execution program, and an execution program for rearranging and coding fuzzy reasoning rules, a RAM 12 for storing fuzzy reasoning rules and membership functions, a membership register 13 for temporarily storing degree of membership in each antecedent proposition, a keyboard 14 for inputting fuzzy reasoning rules and the like, a port 15 for inputting and outputting input and output data, and a display unit 16 comprising a CRT of liquid-crystal display device for displaying inputted rules, results of reasoning, etc.

In order to make the description more concrete and easier to understand, it will be assumed that rules ("If, then" rules) shown in FIG. 2 have been established.

Input variables are represented by $x1$, $x2$, $x3$ and $x4$. The input variables are not limited to four types. Output variables are represented by $y1$ and $y2$ and are not limited to two types.

PL–NL are labels representing linguistic information which membership functions mean. There are seven types of labels, wherein PL means "positive large", PM "positive medium", PS "positive small", ZR "almost zero", NS "negative small", NM "negative medium" and NL "negative large".

It is assumed that the membership functions of an antecedent are of seven types for each input variable. Of course, the shapes and positions of the membership functions may differ if input variables differ, even though labels are the same.

It is assumed that seven types of membership functions of a consequent also have been set for each output variable. In order to simplify the processing operations, the consequent membership functions can be represented by a singleton.

These membership functions are created in advance and the data representing them is stored in the RAM 12.

The antecedent and consequent of each rule shown in FIG. 2 are separated according to the input variables and output variables. The separated entities shall be referred to as sub-rules. One sub-rule contains one fuzzy proposition (a pair consisting of an input/output variable and a membership function). For example, Rule 1 is separated into the following four sub-rules:

If $x1$=PL and $x2$=PM and $x4$=PS then $y1$=PM

The group of rules shown in FIG. 2 is inputted from the keyboard 14 and stored in the RAM 12. The order in which these rules are inputted is arbitrary. It is assumed that the rule numbers are assigned in the order in which the rules are inputted.

According to the present invention, a group of rules of this kind is analyzed and reorganized. The group of rules shown in FIG. 2 is reorganized in the manner illustrated in FIG. 3.

Figure 5:
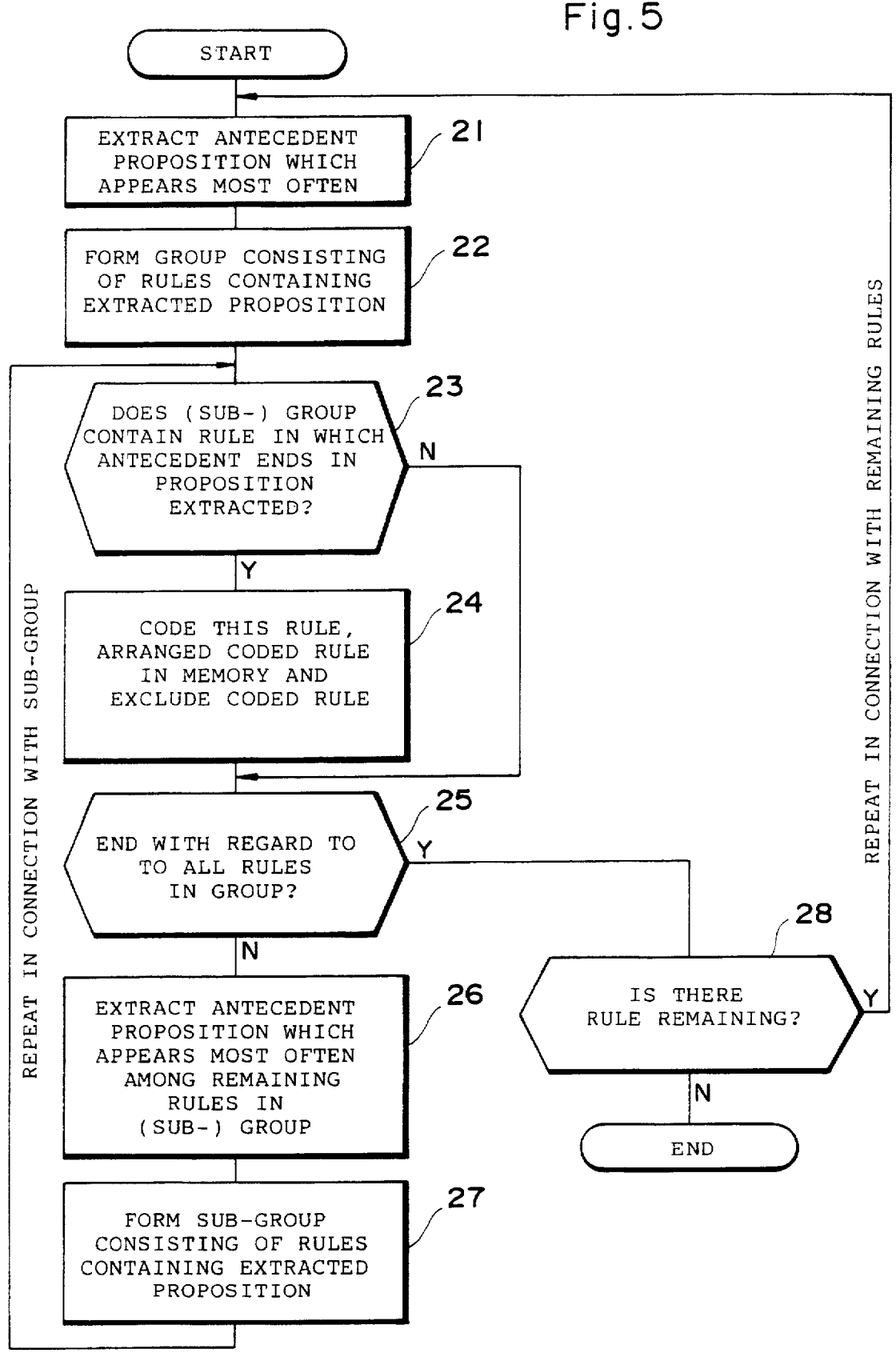
FIG. 5 is a flowchart showing processing for rearranging and coding rules according to the invention.

The processing for such analysis and reorganization is performed in accordance with the procedure shown in FIG. 5.

The proposition (sub-rule) which appears most frequently in the antecedents of all rules is found (step 21). In the group of rules illustrated in FIG. 2, the proposition $x1$=PL appears most often.

Next, one group is formed of rules in which the proposition $x1$=PL extracted at step 21 is contained in their antecedent (step 22). Since $x1$=PL is contained in Rules 1, 2, 6, 8 and 9, these rules form one group.

In the rules belonging to this group, it is determined whether a rule exists in which only the proposition $x1$=PL extracted at step 21 is possessed by the antecedent. If such a rule exists, the rule is extracted, this rule is coded (the coding will be described later), the coded rule is stored in the rule memory (RAM 12) and the rule is excluded from the above-mentioned group (steps 23, 24). Since the antecedent of Rule 8 consists solely of $x1$= PL, Rule 8 is coded and excluded.

In the above-mentioned group, the antecedent proposition which appears most frequently in the other rules from which Rule 8 excluded at step 24 is eliminated is found (step 26). In the remaining Rules 1, 2, 6 and 9, the proposition which appears most frequently is x2=PM.

A sub-group is formed of rules in which the proposition x2=PM is contained in the antecedent (step 27). The Rules 1, 6 and 9 construct this sub-group.

Processing similar to that of steps 23–27 is executed with regard to this sub-group, whereby rules are rearranged and coded in an order in which common antecedent propositions having a high frequency of appearance come first and in an order wherein the common antecedent propositions are contained in larger proportions. The rearranged rules are excluded from the group of rules still unorganized.

Though Rules 1, 6 and 9 all contain the antecedent propositions x1=PL and x2=PM, the antecedent propositions do not end in these two antecedent propositions (NO at step 23). Accordingly, these rules are sub-grouped further (step 26). Since common antecedent propositions no longer exist, these Rules 1, 6, 9 are separated into individual sub-groups (subgroups each containing only one rule). The Rules 1, 6, 9 are arranged in a fixed order (in this embodiment, the order of the other input variables and output variables contained in the rules).

Since Rule 2 still has not been put in order in the above-mentioned group, Rule 2 is disposed after Rules 6, 9 and 1 (steps 23–27 are repeated).

If, when rearrangement of the rules in the group containing x1=PL ends in this manner (YES at step 25), rules still remain (YES at step 28), the processing of steps 21–27 is repeated with regard to these remaining steps.

In the example illustrated in FIG. 2, the foregoing processing is repeated with regard to the remaining Rules 3, 4, 5, 7, and 10.

The separation of rules into sub-rules and the coding thereof may be performed after the rearrangement of all rules ends.

In any case, in concurrence with the rearrangement of the rules or after rearrangement ends with regard to all rules, the rules are separated into sub-rules, the sub-rules are arranged in an order suited to the serial processing of fuzzy reasoning operations, and a command is assigned to each sub-rule.

Figure 4:
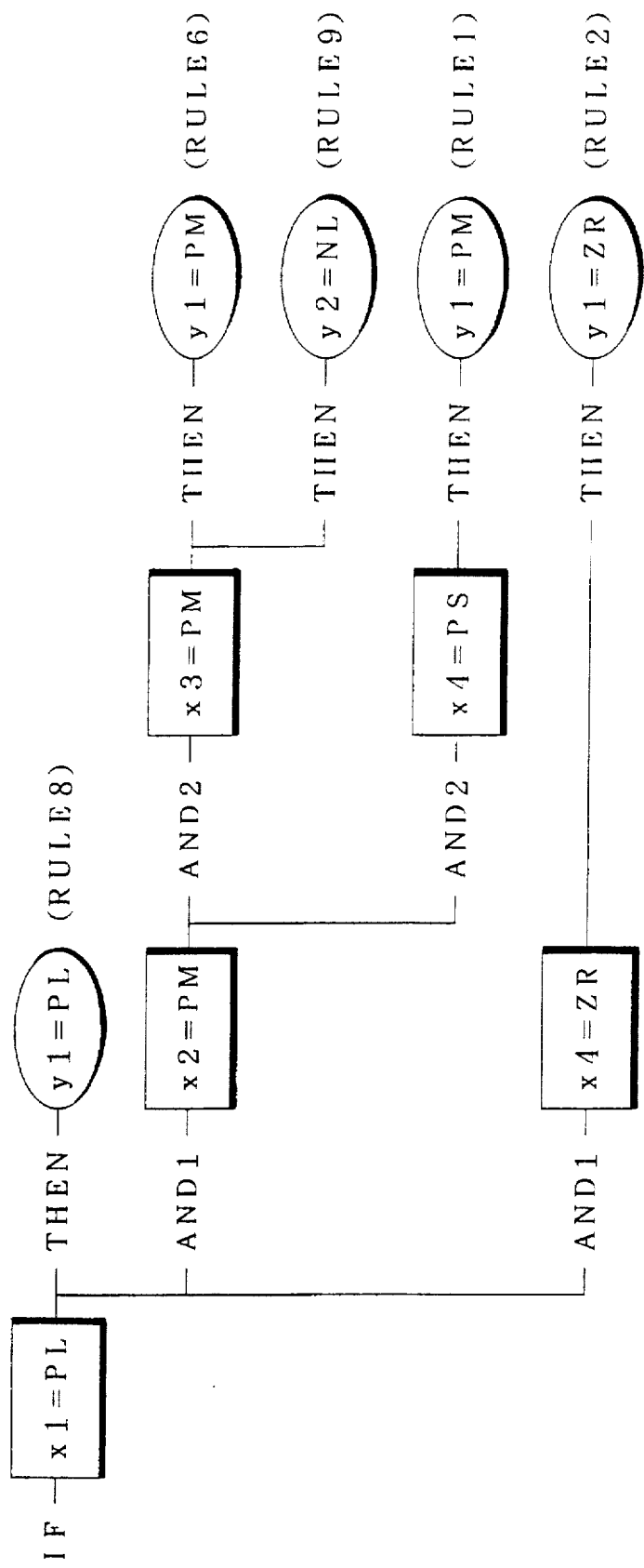
FIG. 4 illustrates a tree structure of fuzzy reasoning rules that have been rearranged.

For example, the sub-rules of Rules 1, 2, 6, 8, 9 which belong to the aforementioned group are systematized so as to form a tree structure, as depicted in FIG. 4.

The coding of the sub-rules is performed by allocating a code to each input variable and membership function, with the code representing the input variable and membership function. In a case where coding has already been performed at the time of rule input, the coding processing will be unnecessary and only the processing for assigning commands will be carried out.

The processing for assigning commands is as follows: A command IF is assigned to the proposition x1=PL having the highest frequency.

A command THEN is assigned to the consequent of Rule 8, in which only the proposition x1=PL is contained in the antecedent.

A command AND1 is assigned to the proposition x2=PM, which has the second highest frequency.

In Rules 1, 6, 9 all of which contain these propositions x1=PL, x2=PL, a command AND2 is assigned to the third propositions x3=PM, x4=PS, and a command THEN is assigned to the consequents of these rules.

The command AND1 is assigned to the second proposition x4=ZR of the other rule, namely Rule 2, which contains the proposition x1=PL, and the command THEN is assigned to the consequent of this rule.

These sub-rules are arranged in the order of the aforementioned rearranged rules, and the sub-rules are stored in the rule memory in the manner shown in FIG. 6. A code DEF indicating deterministic processing and information relating to deterministic processing (namely information representing the types of output variable to undergo deterministic processing and the method of deterministic processing) is arranged at the end of the sub-rules. An end code END and end processing information are disposed at the end of the rule data.

Fuzzy reasoning processing will be described next.

The RAM 12 has a work area in addition to the rule memory area shown in FIG. 6. As shown in FIGS. 7a, 7b and 7c, the work area is provided with an input-data area, an output-data area and a consequent-data area.

The input-data area (FIG. 7a) stores input data regarding each input variable and has storage locations (e.g., one byte each) the number of which is equal to the number of types of input variables.

The output-data area (FIG. 7b) stores the results of fuzzy reasoning regarding each output variable as output data and has storage locations the number of which is equal to the number of types of output variables.

The consequent-data area (FIG. 7c) stores, for each output variable, degree of membership to be applied to the membership functions thereof. This area has storage locations the number of which is equal to the number of types of membership functions of the consequent [(number of types of output variables)×(seven labels)].

The membership register 13 is provided with a plurality of registers, as illustrated in FIG. 8. These registers temporarily store degrees of membership calculated by degree-of-membership computation or degrees of membership that are the result of MIN operation. Each comprises a storage location consisting of one byte. Let these registers be represented by register Ri (i=1, 2, 3, 4, . . . ).

Figure 9:
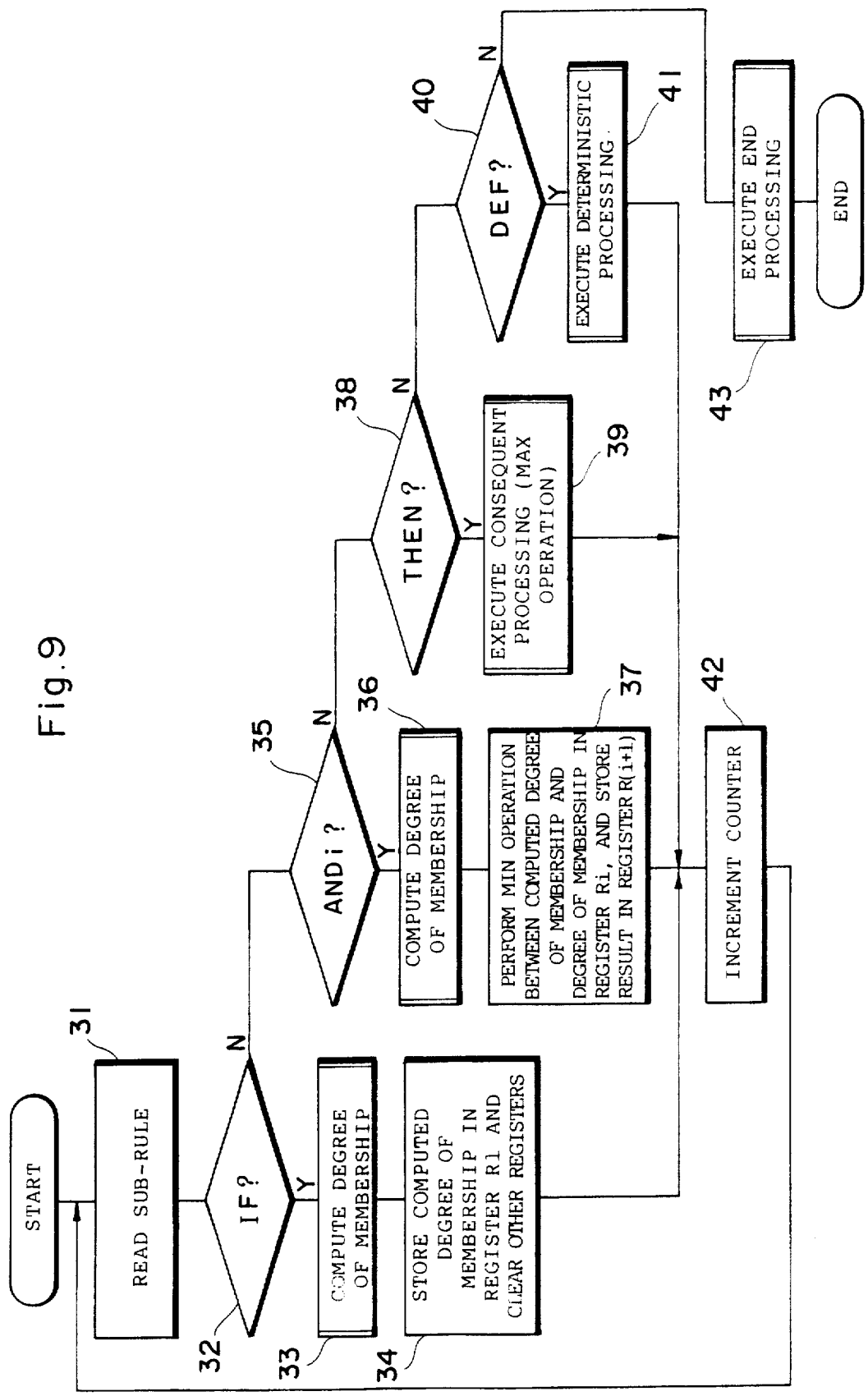
FIG. 9 is flowchart illustrating fuzzy reasoning processing according to the present invention.

FIG. 9 illustrates the flow of fuzzy reasoning processing. This processing begins after input data regarding all input variables is set in the work area of the RAM 12.

The codes of the sub-rules from the rule memory (FIG. 6) are read out one at a time in accordance with the sequence of the code arrangement (step 31) and it is determined whether a command accompanying a read sub-rule is IF, ANDi,THEN or DEF (steps 32, 35, 38, 40).

If the command is IF, this is indicative of an antecedent. Accordingly, the input data regarding the input variable of the sub-rule is read out of the input-data area and the degree of membership of this input data in the membership function of the same sub-rule is Calculated (steps 32, 33). The degree of membership referred to here is a membership function value (grade) obtained when input data (an input value) regarding an input variable contained in a sub-rule is applied to the membership function of the same sub-rule. The computation of this degree of membership may be performed by a well-known method.

Next, the calculated degree of-membership in this sub-rule is stored in the first register R1 and all of the other registers are cleared of their contents (step 34).

Thereafter, an address counter indicating the address of the rule memory is incremented (step 42), the program returns to step 31 and the next sub-rule is read out.

In a case where the code is ANDi (i=1, 2, . . . ), the degree of membership in this sub-rule is calculated (steps 35, 36), a MIN operation is performed between this calculated degree of membership and the degree of membership stored in the register Ri, and the result of the MIN operation is stored in the register R(i+1) (step 37). The number (i+1) of the register R(i+1) is stored in a register number counter. The MIN operation is performed between all of the antecedent sub-rules contained in one rule. Thereafter, the address counter is incremented (step 42).

If the code is THEN, a MAX operation is performed between the degree of membership that has been stored in the register of the number stored in the register number counter and a value (initially 0) that has been stored in a storage location, which corresponds to the consequent membership function, of the consequent data area. The result of this MAX operation is stored in a storage location regarding the relevant consequent membership function in the corresponding consequent data area (steps 38, 39). This MAX operation is carried out in order to obtain a unique degree of membership, which is to be made to act upon a common consequent membership function, between rules having the same consequent (y1=PM), as in Rules 1 and 6. Thereafter, the address counter is incremented and the program returns to step 31.

In a case where the read code is DEF, deterministic processing is performed for every output variable using the degree-of-membership data stored in the consequent-data area (steps 40, 41). In a case where a consequent membership function is a singleton, the degree of membership of the consequent-data area directly represents the height of the corresponding singleton. Methods of deterministic processing include a center-of-gravity method for obtaining the position of the center of gravity of the consequent membership functions (singletons) to which the degree of membership has been applied, and a maximum-height method for selecting the membership function having the maximum height. The result of deterministic processing is stored in the output-data area as output data for each output variable.

Thereafter, the address counter is incremented and an end code is read out (steps 42, 31). As a result, end processing such as the outputting of output data is performed and one cycle of a fuzzy reasoning operation ends (step 43).

This fuzzy reasoning processing method is advantageous in that it does not require the provision of membership registers the number of which is equal to the number of rules; it will suffice to provide only several of the membership registers, as shown in FIG. 8.

Industrial Applicability

The method of rearranging fuzzy reasoning rules, the method of coding these rules and the method of executing fuzzy reasoning processing in accordance with the present invention are ideal particularly for use in enhancing processing efficiency in a fuzzy reasoning apparatus, fuzzy control apparatus and the like.

What is claimed is:

1. A computer implemented method of rearranging a plurality of fuzzy reasoning rules stored in a first memory area of said computer, each of the rules comprising an antecedent, including at least one antecedent proposition, and a consequent, said method comprising the steps of:

(a) extracting an antecedent proposition, from said rules stored in said first memory area, which has the highest frequency of appearance in said rules stored in said first memory area, and forming one group of rules consisting of those rules stored in said first memory area which have the extracted antecedent proposition in common;

(b) if said one group of rules contains a rule in which an antecedent has only the extracted antecedent proposition, storing that rule in a second memory area of said computer, and excluding that rule from said one group of rules;

(c) extracting an antecedent proposition having the next highest frequency of appearance from among the rules remaining in said one group of rules, and forming a sub-group of rules consisting of rules which have said extracted antecedent proposition having the next highest frequency of appearance in common;

(d) storing the rules in the second memory area in an order of common antecedent propositions having the highest frequency of appearance and in an order in which the common antecedent propositions are included in larger proportion, by repeating the processing of said steps (b) and (c) with regard to said sub-group of rules; and (e) after the processing of said steps (a) through (d) has been completed with respect to said one group of rules, repeating the processing of said steps (a) through (d) on the remaining rules stored in said first memory, from which the rules contained in said one group of rules have been eliminated, until all rules stored in said first memory area are eliminated.

2. The method according to claim 1, wherein said rule storing processing in said steps (b) and (d) comprises the steps of coding the rule and storing the coded rule in the second memory area.

3. The method according to claim 2, wherein said rule coding processing further comprises the steps of separating a rule into sub-rules each containing a single proposition constituting an antecedent or a consequent, and coding variables and membership functions contained in the sub-rules.

4. The method according to claim 3, further comprising the steps of assigning a command to the code of each sub-rule, in dependence upon whether a sub-rule is contained in an antecedent or a consequent, and in dependence upon the order of appearance of a sub-rule in the antecedent or consequent, and storing the sub-rule together with the command assigned thereto in said second memory area.

5. A computer implemented method of rearranging a plurality of rules stored in a first memory area of said computer, each of the rules comprising an antecedent, including at least one antecedent proposition, and a consequent, said method comprising the steps of:

(a) extracting an antecedent proposition, from said rules stored in said first memory area, which has the highest frequency of appearance in said rules stored in said first memory area, and forming one group of rules consisting of those rules stored in said first memory area which have the extracted antecedent proposition in common;

(b) if said one group of rules contains a rule in which an antecedent has only the extracted antecedent proposition, storing that rule in a second memory area of said computer, and excluding that rule from said one group of rules;

(c) extracting an antecedent proposition having the next highest frequency of appearance from among the rules remaining in said one group of rules, and forming a sub-group of rules consisting of rules which have said extracted antecedent proposition having the next highest frequency of appearance in common;

(d) storing the rules in the second memory area in an order of common antecedent propositions having the highest frequency of appearance and in an order in which the common antecedent propositions are included in larger proportion, by repeating the processing of said steps (b) and (c) with regard to said sub-group of rules; and (e) after the processing of said steps (a) through (d) has been completed with respect to said one group of rules, repeating the processing of said steps (a) through (d) on the remaining rules stored in said first memory, from which the rules contained in said one group of rules have been eliminated, until all rules stored in said first memory area are eliminated.

6. The method according to claim 5, wherein said rule storing processing in said steps (b) and (d) comprises the steps of coding the rule and storing the coded rule in the second memory area.

7. The method according to claim 6, further comprising the steps of separating a rule into sub-rules each containing a single proposition constituting an antecedent or a consequent, and coding variables and membership functions contained in the sub-rules.

8. The method according to claim 7, further comprising the steps of assigning a command to the code of each sub-rule, in dependence upon whether a sub-rule is contained in an antecedent or a consequent, and in dependence upon the order of appearance of a sub-rule in the antecedent or consequent, and storing the sub-rule together with the command assigned thereto in said second memory area.

9. An apparatus, which has a first memory area and a second memory area, for rearranging a plurality of fuzzy reasoning rules stored in said first memory area, each of the rules comprising an antecedent, including at least one antecedent proposition, and a consequent, comprising:

grouping means for extracting an antecedent proposition, from said rules stored in said first memory area, which has the highest frequency of appearance in said rules stored in said first memory area, and forming one group of rules consisting of those rules stored in said first memory area which have the extracted antecedent proposition in common;

first storing means which, if said one group of rules contains a rule in which an antecedent has only the extracted antecedent proposition, stores that rule in said second memory area, and excludes that rule from said one group of rules;

sub-grouping means for extracting an antecedent proposition having the next highest frequency of appearance from among the rules remaining in said one group of rules, and forming a sub-group of rules consisting of rules which have said antecedent proposition having the next highest frequency of appearance in common;

second storing means for storing the rules in said second memory area in an order of common antecedent propositions having the highest frequency of appearance in an order in which the common antecedent propositions are included in larger proportion, by repeating the processing executed by said first storing means and said sub-grouping means with regard to said sub-group of rules; and control means which, after the processing performed by said grouping means, first storing means, sub-grouping means and second storing means has been completed with respect to said one group of rules, causes the processing on the remaining rules stored in said first memory, from which the rules contained in said first group of rules have been eliminated, performed by said grouping means, first storing means, sub-grouping means and second storing means, to be repeated until all rules stored in said first memory area are eliminated.

10. The apparatus according to claim 9, wherein said first and second storing means includes first and said second coding means, respectively, each of said first and second coding means coding the rule and storing the coded rule in said second memory area.

11. The apparatus according to claim 9, wherein said first and second coding means form sub-rules by separating a rule into a single proposition constituting an antecedent or a consequent, each of which forms a sub-rule, and perform coding of variables and membership functions contained in the sub-rules.

12. An apparatus according to claim 11, wherein said first and second coding means assign a command to the code of each sub-rule, in dependence upon whether a sub-rule is contained in an antecedent or a consequent, and in dependence upon the order of appearance of a sub-rule in the antecedent or consequent, and store the sub-rule together with the command assigned thereto in said second memory area.

13. An apparatus, which has a first memory area and a second memory area, for rearranging a plurality of rules stored in said first memory area, each of the rules comprising an antecedent, including at least one antecedent proposition, and a consequent, comprising:

grouping means for extracting an antecedent proposition, from said rules stored in said first memory area, which has the highest frequency of appearance in said rules stored in said first memory area, and forming one group of rules consisting of those rules stored in said first memory area which have the extracted antecedent proposition in common;

first storing means which, if said one group of rules contains a rule in which an antecedent has only the extracted antecedent proposition, stores that rule in said second memory area, and excludes that rule from said one group of rules;

sub-grouping means for extracting an antecedent proposition having the next highest frequency of appearance from among the rule remaining in said one group of rules, and forming a sub-group of rules consisting of rules which have said antecedent proposition having the next highest frequency' of appearance in common;

second storing means for storing the rules in said second memory area in an order of common antecedent propositions having the highest frequency of appearance in an order in which the common antecedent propositions are included in larger proportion, by repeating the processing executed by said first storing means and said sub-grouping means with regard to said sub-group of rules; and control means which, after the processing performed by said grouping means, first storing means, sub-grouping means and second storing means has been completed with respect to said one group of rules, causes the processing on the remaining the rules stored in said first memory, from which the rules contained in said first group of rules have been eliminated, performed by said grouping means, first storing means, sub-grouping means and second storing means, to be repeated until all rules stored in said first memory area are eliminated.

14. The apparatus according to claim 13, wherein said first and second storing means includes first and said second coding means, respectively, each of said first and second coding means coding the rule and storing the coded rule in said second memory area.

15. The apparatus according to claim 13, wherein said first and second coding means form sub-rules by separating a rule into a single proposition constituting an antecedent or a consequent, each of which forms a sub-rule, and perform coding of variables and membership functions contained in the sub-rules.

16. An apparatus according to claim 15, wherein said first and second coding means assign a command to the code of each sub-rule, in dependence upon whether a sub-rule is contained in an antecedent or a consequent, and in dependence upon the order of appearance of a sub-rule in the antecedent or consequent, and store the sub-rule together with the command assigned thereto in said second memory area.

* * * * *